United States Patent [19]
Patzer

[11] 3,740,093
[45] June 19, 1973

[54] REMOTE CONTROL FOR AUTOMOBILE WINDOW

[76] Inventor: Norman E. Patzer, N. 22 W. 28166 Edgewater Drive, Pewaukee, Wis. 53072

[22] Filed: Nov. 24, 1970

[21] Appl. No.: 92,483

[52] U.S. Cl.................. 296/146, 49/357, 74/501 R
[51] Int. Cl............................................. B60j 1/10
[58] Field of Search .................... 296/146; 49/357, 49/348, 352; 74/501 M, 98

[56] References Cited
UNITED STATES PATENTS

| | | | |
|---|---|---|---|
| 3,277,678 | 10/1966 | Booth | 74/501 M |
| 3,411,372 | 11/1968 | Skillin | 74/501 M |
| 3,554,049 | 1/1971 | Holmes | 74/501 M |

FOREIGN PATENTS OR APPLICATIONS

| | | | |
|---|---|---|---|
| 553,399 | 5/1943 | Great Britain | 49/357 |
| 669,181 | 3/1952 | Great Britain | 49/357 |

Primary Examiner—Leo Friaglia
Assistant Examiner—John A. Pekar
Attorney—Cyril M. Hajewski

[57] ABSTRACT

A manually operated mechanical remote control for an automobile window. A hand crank is mounted on the automobile dash board convenient to the driver for manually operating a remote window. The hand crank is coupled to the window operating mechanism by a flexible cable so that by revolving the crank, the driver can readily open or close the window while remaining in the driver's seat behind the steering wheel.

2 Claims, 2 Drawing Figures

3,740,093

Patented June 19, 1973

Inventor
Norman E. Patzer
By Cyril M. Hajewski
Attorney

REMOTE CONTROL FOR AUTOMOBILE WINDOW

BACKGROUND OF THE INVENTION

1. Field of the Invention

The present invention relates to a mechanical remote control for operating an automobile window from the driver's position.

2. Description of the Prior Art

In the larger automobiles, the driver is a substantial distance from some of the windows so that it is not possible to manually operate such remote windows without leaving the driver's position or without reaching extensively to gain access to the window operating handle. This problem has been recognized for a long time and the automobile manufacturers have provided power operated windows with the controls being readily accessible to the driver for his convenience.

Thus, U.S. Pat. Nos. 1,916,579 and 2,219,527 are early disclosures showing electrically operated automobile windows. In like manner, U.S. Pat. Nos. 2,334,031 and 2,366,127 provide for the pneumatic operation of automatic windows. Fluid operated automobile windows have also been provided as described in U.S. Pat. No. 2,348,838.

The power operated windows disclosed in these prior art patents are relatively expensive to manufacture and therefore contribute substantially to the total cost of the automobile. The prior art does not show a simple mechanical remote control which can be operated from the driver's position for operating only one of the windows in the car.

It is therefore an object of the present invention to provide a simple and inexpensive mechanical remote control for an automobqle window that may be operated by the driver while he is operating the automobile. Even though this arrangement gives the operator control of only one remote window, this will be sufficient to give the driver substantial control over the ventilation within the automobile while he is operating it.

SUMMARY OF THE INVENTION

According to this invention, the remote control window crank is mounted on the automobile dash board or other suitable mounting structure where the crank will be convenient to the driver while he is operating the automobile. The crank is connected by a flexible cable to the window operating mechanism within the door. The flexible cable passes from the crank to extend along the back of the dash board and into the interior of the door where it is coupled to the window operating mechanism. Sufficient slack is provided in the cable between the door and the automobile body to enable the door to be opened without interfering with the cable.

DESCRIPTION OF THE PREFERRED EMBODIMENT

Figure 1:
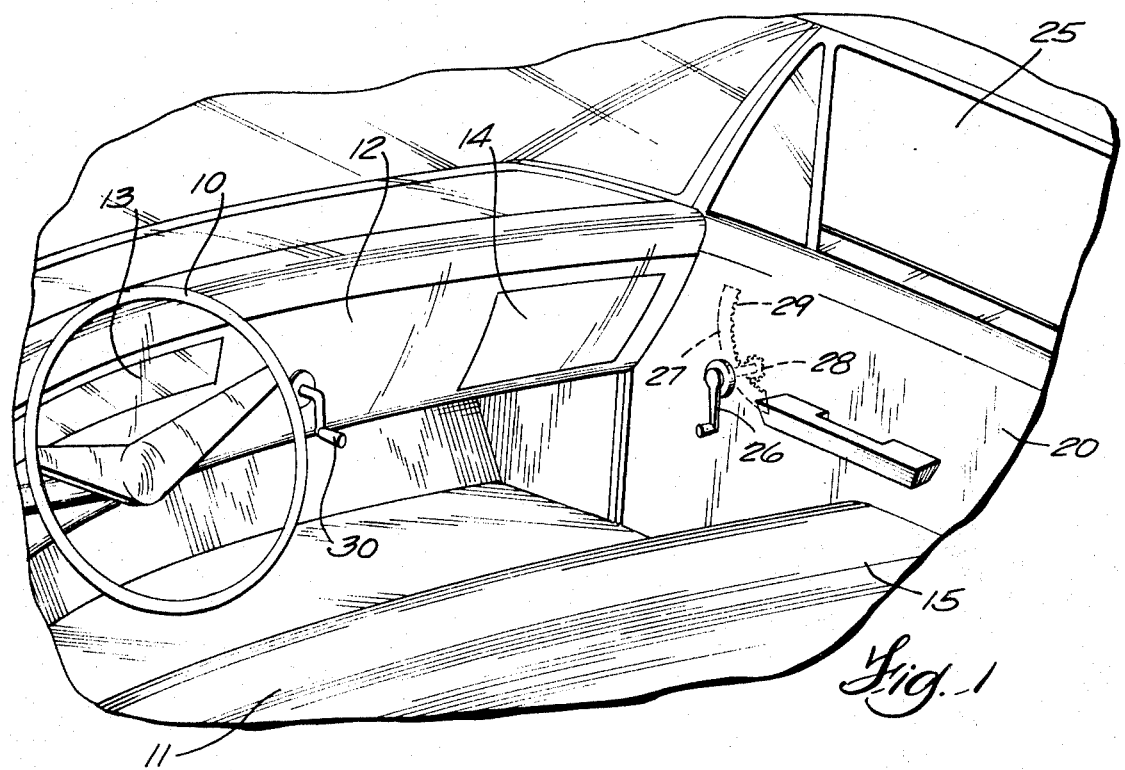
FIG. 1 is a fragmentary perspective view of the interior of an automobile showing the remote control crank for the automobile window mounted on the dash board and the direct control crank for the same window mounted on the automobile door.

Reference is now made more particularly to the drawings and specifically to FIG. 1 thereof which illustrates the front portion of the interior of an automobile incorporating the features of the present invention. A steering wheel 10 is located at the driver's seat or position 11 in the conventional manner for steering the automobile. Forward of the steering wbeel 10 is mounted a dashboard 12 containing an instrument panel 13 that is disposed directly in front of the driver. The opposite end of the dashboard 12 includes a glove compartment 14 which is disposed in front of the passenger in the front seat of the automobile.

The passenger is seated in the passenger position 15 to the right of the driver. A conventional door 20 is hingedly supported by the body of the automobile and provides ingress and egress for the passenger seated in the passenger position 15. The door 20 includes a window 25 which is shown in its uppermost closed position. However, the window 25 may be lowered into the door 20 for opening the window by revolving a crank handle 26. The crank handle 26 is rotatably supported by the door 20 and may be revolved in one direction for lowering the window 25 and in the opposite direction to raise the window 25 to its closed position. The crank handle 26 is conveniently located for access by the passenger seated in the passenger position 15 for closing or opening the window 25. To this end, the crank handle 26 is provided with a shaft 27 having at its opposite end a pinion 28. The pinion 28 is in meshing engagement with a gear segment 29 which is actuated by rotation of the pinion 28 for actuating the conventional linkage (not shown) for raising and lowering the window 25.

It is apparent that although the window crank handle 26 is readily accessible to the front seat passenger seated in the position 15, it is remote from the driver located in the driver's seat 11 so that it is very inconvenient for the driver to reach it and manipulate it. In larger cars, the driver has to slide out of the driver's seat 11 toward the passenger position 15 in order to reach the crank handle 26. In most cases, this cannot be done while operating the automobile without danger of losing control of the automobile.

In order to alleviate this inconvenience to the driver, power operated automobile windows have been provided in which the coltrols for the source of power to operate the windows are conveniently located for access by the driver. However, this is an expensive arrangement and the present invention contemplates a simple mechanical remote control for the window 25 that is relatively inexpensive to install and yet provides the convenience to the driver. To this end, a second hand crank 30 is rotatably mounted on the dash board 12 directly in front of the driver located in the driver's position 11 so that he can readily grasp the crank handle 30 with his right hand. This can be done while firmly gripping the steering wheel 10 with the left hand so that the crank handle 30 can be safely manipulated while the car is being operated. This can be done without in any way detracting from the ability of the driver to operate the vehicle. Although the crank handle 30 is shown as being supported by the dashboard 12, it should be understood that other mounting arrangements can be provided if desired, the only requirement being that the crank handle 30 be conveniently located for accessibility to the driver. Thus, a bracket could be mounted on the steering wheel column for supporting the crank handle 30. In the drawing the crank handle 30 is shown as being rotatably supported by the dashboard 12 as a preferred embodiment inasmuch the operating mechanism may then be disposed, out of view, behind the dashboard 12.

The crank handle 30 is provided for remote operation of the window 25 by the driver located in the driver's position 11. Accordingly, as clearly shown in FIG. 2, the crank handle 30 is provided with a shaft 31 that extends through the dashboard 12 for receiving a bevel gear 32 that is mounted to rotate with the crank handle 30 but is disposed behind the dashboard 12 where it is not visible from the passenger compartment of the autombile. The bevel gear 32 is in meshing engagement with a second bevel gear 33 that is disposed ninety degrees to the bevel gear 32.

The bevel gear 33 is journaled in an L shaped bracket 34 whch is secured to the interior surface of the dashboard 12 with a leg extending outwardly therefrom to receive the shaft of the bevel gear 33. The bracket 34 therefore rotatably supports the bevel gear 33 while it is in meshing engagement with the cooperating bevel gear 32.

A flexible cable 35 is connected to the shaft of the bevel gear 33 to be rotated thereby. The flexible shaft 35 extends behind the dashboard 12 and through a suitable opening in the body of the automobile into the interior of the door 20. The end of the flexible shaft 35 within the door 20 is in engagement with the pinion 28 so that rotation of the flexible shaft 35 will cause a corresponding rotation of the pinion 28 to actuate the gear segment 29 and thereby cause an opening or closing of the window 25. One direction of rotation of the pinion 28 will cause an opening of the window 25 while the opposite direction of rotation will cause a closing of the window 25.

Figure 2:
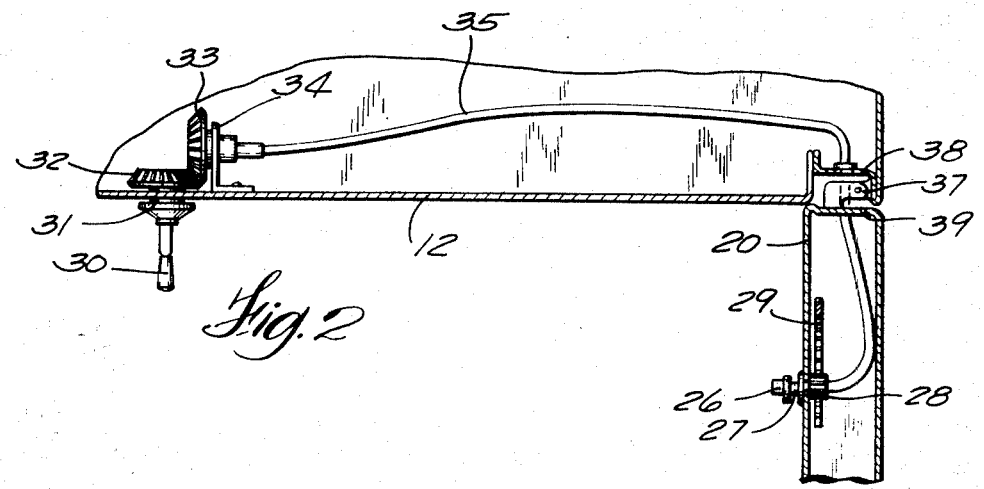
FIG. 2 is a fragmentary view of an automobile dash board and door, partly in horizontal section and parly in plan, showing the mechanical remote control arrangement of the present invention for operating an automobile window.

It will be noted that the door 20 is supported by the body of the car through hinges 37 and the door is pivoted in a counterclockwise direction from the position shown in FIG. 2 to open it to provide ingress to the vehicle and egress therefrom. The flexible shaft 35 passes through the space between the body plate 38 and a wall 39 of the door 20. Of course, when the door 20 is pivoted outwardly to its open position, the door wall 39 will pivot with the door but there is sufficient amount of flexible cable 35 between the plate 38 and the door wall 39 to permit the door 20 to open without interfering with the cable. The excess cable in this space will merely tend to straighten out with the opening of the door, and will still remain capable of operating the window 25 even while the door is open. With this arrangement there is no need for any sliding movement between the flexible cable 35 and the wall 39 or the flexible cable 35 and the plate 38 when the door is moved between its open and closed positions.

In operation, the operator of the vehicle merely revolves the crank 30 to cause a corresponding rotation of the bevel gears 32 and 33. Rotation of the bevel gear 33 causes a like rotation of the flexible shaft 35 by reason of its connection therewith, and the rotation of the flexible cable 35 produces a rotation of the pinion 28 for actuating the window 25. Thus, the driver of the vehicle can conveniently operate the window 25 without leaving the driver's seat 11 or reaching away from the steering wheel 10 by simply manipulating the crank handle 30 which is readily accessible to him from the driver's position 11.

In the preferred embodiment, in the interest of simplicity, the crank handle 30 is shown connected directly to the bevel gear 32 and the crank handle 26 is shown connected directly to the pinion 28. Accordingly, when the crank handle 26 is rotated to operate the window 25, this rotation will be transmitted through the flexible shaft 35 and the bevel gears 32 and 33 to cause a corresponding rotation of the crank handle 30. Conversely, when the crank handle 30 is rotated, the crank handle 26 will also rotate with it. This arrangement has been shown as it would not in any way interfere with the passengers in the automobile. However, if for any reason this should be found to be objectionable, a one way clutch can be interposed between the crank handle 30 and the bevel gear 32 as well as between the crank handle 26 and the pinion 28. The one way clutches would be arranged to transmit the rotation from the crank handle 30 to the bevel gear 32, but rotation of the bevel gear 32 would not cause a rotation of the crank handle 30. In like manner, a rotation of the crank handle 26 by a passenger in the automobile, would cause a rotation of the pinion 28 for operating the window 25, but the rotation of the pinion 28 by the crank handle 30 would not cause a rotation of the crank handle 26.

The mechanical remote control arrangement of the present invention is shown in the drawing as being connected for enabling the driver of the vehicle to operate the window 25 in the front door adjacent to the passenger seat 15. The operation of this single window by the driver of the vehicle, in addition to the operation of the window which is located directly next to the driver, will enable the driver to regulate the ventilation in the vehicle to suite his comfort. However, if desired, the crank handle could be connected in the same manner to operate other windows of the vehicle or additional crank handles could be provided for operating the other windows in the rear passenger compartment of the automobile.

From the foregoing detailed description of the construction and operation of the illustrative embodiment of the present invention it will become apparent that a new and improved mechanical remote control has been provided for operating the windows of an automobiile. The invention contemplates a simple and inexpensive mechanical installation which enables the driver of the vechicle to operate a remote window while driving the automobile.

Although the illustrative embodiment of the present invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

I claim:

1. In a manually operated mechanical rmote control for an automobile window that is located in a hinged door of the automobile; a remote crank handle rotatably supported by the body of the automobile independently of the door, a window operating mechanism in engagement with the window and actuatable to open and close the window; a direct crank handle mounted on the door and coupled to said window operating mechanism, said direct crank handle being rotatable to actuate said window operating mechanism for opening and closing the window, and a flexible cable having one end connected to said remote crank handle for rotation with said handle, said cable extending from said remote crank handle behind the dash board of the automobile and into the door containing the window where said flexible cable is coupled to said window operating mechanism so that rotation of said flexible cable by said remote crank handle will actuate said window operating mechanism for opening and closing the window, sufficient slack being provided to said cable between the automobile body and the hinged edge of the door so that said cable will not interfere with the opening and closing of the door.

2. A manually operated remote control for an automobile window according to claim 1; including a first bevel gear mounted to rotate with said remote crank handle, said remote crank handle being disposed on the front face of the dash board for access by the driver and said first bevel gear being disposed behind the dash board where it is not visible to the occupants of the passenger compartment of the automobile; a bracket mounted behind the dash board; a second bevel gear rotatably supported by said bracket and in engagement with said first bevel gear for rotation therewith, said second bevel gear being coupled to said flexible cable so that said flexible cable will rotate with said second bevel gear when the latter is actuated by manipulation of said remote crank handle.

* * * * *